United States Patent [19]

Sasiela et al.

[11] 4,201,484
[45] May 6, 1980

[54] CONTINUOUS MIXING APPARATUS

[75] Inventors: Ronald J. Sasiela, Whitestone, N.Y.; Daniel T. Layne, Brea, Calif.

[73] Assignee: Modern Maid Food Products, Inc., Garden City, N.Y.

[21] Appl. No.: 953,493

[22] Filed: Oct. 23, 1978

[51] Int. Cl.² .................. B01F 7/08; B01F 15/02; B01F 5/12
[52] U.S. Cl. .................. 366/153; 366/156; 366/182; 366/186; 366/190; 366/296; 366/320
[58] Field of Search .............. 366/142, 152, 153, 154, 366/155, 156, 157, 160, 178, 182, 186, 296, 294, 38, 50, 64, 190, 320

[56] References Cited

U.S. PATENT DOCUMENTS

| | | | |
|---|---|---|---|
| 2,564,715 | 8/1951 | North | 366/296 |
| 3,186,602 | 6/1965 | Ricciardi | 366/294 |
| 3,224,738 | 12/1965 | Tarukawa | 366/152 |
| 3,387,829 | 6/1968 | Nangoh | 366/64 |
| 3,459,409 | 8/1969 | Goldberger | 366/64 |
| 3,495,808 | 2/1970 | Klein | 366/142 |
| 3,910,173 | 10/1975 | Zepponi | 99/277.1 |

OTHER PUBLICATIONS

Acrison Bulletin, No. 711; Acrison, Inc., 180 Broad St., Carlstadt, New Jersey 07072

Primary Examiner—Robert W. Jenkins
Attorney, Agent, or Firm—Lerner, David, Littenberg & Samuel

[57] ABSTRACT

Apparatus is disclosed for continuously preparing a mixture of two or more constituents with the apparatus including a first container having an input for the reception of a first one of the constituents, an output, and advancing means for advancing the first constituent through the output. The apparatus further includes a second container having an input for the reception of a second one of the constituents, an output, and advancing means for advancing the second one of the constituents through the output of the second container. The apparatus includes a third container having an input opening for receiving the first and second constituents from the respective outputs of the first and second containers, and the third container further includes an output and mixing means for blending the first and second ones of the constituents into a blended air-free mixture and for advancing the blended mixture through the output of the third container. In the preferred utilization of the present invention, the output from the third container flows to an extruder which produces fabricated food products in a desired shape.

15 Claims, 9 Drawing Figures

CONTINUOUS MIXING APPARATUS

FIELD OF THE INVENTION

This invention relates to extruded food products and, more particularly, to apparatus for continuously preparing a mixture of two or more constituent products utilized in the manufacture of fabricated food products.

BACKGROUND OF THE INVENTION

In U.S. Pat. No. 3,650,766, there is disclosed a process for the manufacture of fabricated food products. In one embodiment disclosed in U.S. Pat. No. 3,650,766, a slurry of food product is extruded or otherwise molded into a desired shape and its outer surface is sprayed or otherwise washed with a solution containing a gel-forming material. The formed food product coated with the gel-forming material is then contacted with a source of alkaline earth ions, for example, by contact with a spray or bath containing such ions, and the resultant gel formation helps to maintain the shape of the fabricated food product.

In another technique disclosed in the No. '766 patent (see, for example, EXAMPLE 1), the food product (and other minor ingredients such as wheat, flour, salt and sugar) is mixed in batches with the gel-forming material to form a slurry which is fed through appropriate extrusion apparatus. The extruded product is then contacted with a gelling agent, and the resultant gel helps to maintain the shape of the extruded food product.

One of the advantages alleged to flow from the above-described batch processing technique is the claim that the process is time indpendent. That is to say, one of the claimed advantages of this type of process is that the food products and the gelling material can allegedly be premixed, stored "on the shelf" and utilized whenever it is desired to produce the fabricated food product. This is to be contrasted with a batch process wherein quantities of the food products are mixed with the gelling material and the gelation agent such that gelation begins to occur immediately (even if a sequestering system is included) making subsequent extrusion that much more difficult. Unfortunately, and as will be discussed below, even the first process is not in reality time independent since workers must take into account the deteriorating effect of time on gel strength.

It has been suggested in the prior art that one way to produce fabricated food products in a fashion which would eliminate these problems is to produce the fabricated food product on a continuous basis. That is, feed the extruder with a mixture of the food products and the gel-forming material (with or without the gelation agent) on a continuous basis immediately preceding the extrusion step. Such a process is broadly suggested in the Rivoche U.S. Pat. No. 2,791,508, although no specific mechanism is shown in Rivoche or know, up to the time of the present invention, which will effectively perform such functions.

SUMMARY OF THE INVENTION

The instant invention eliminates the drawbacks of batch processing discussed above by providing apparatus for continuously perparing a mixture of two or more constituents of the type discussed above. For example, in employing the apparatus of the present invention, a comminuted food product such as dices onions is continuously fed into a container or hopper which includes means for advancing same through the hopper output into a blender. A second container or hopper receives the gelling material (either alone or in combination with the gelation agent and a suitable sequestering agent to delay gelation) and the second hopper likewise includes means for advancing the material contained therein into the aforementioned blender. The advancing means associated with each of the first and second hoppers may be gravimetric or volumetric feeder, but preferably volumetric feeders are employed an comprise double augers whose blades or flights are hellically oriented in opposite directions in order to properly agitate and advance the respective materials. The blender includes mixing means in the form of a double auger whose flights or blades are hellically oriented in the same direction, contrary to normal utilization of such devices, such that the paste of the blended materials tends to forcefully accumulate in the forward end of the blender, close to its output thereof. As the blended paste slowly undulates and is forced forward to accumulate in the aforementioned manner, undesirable air pockets are squeezed out, resulting in an extremely uniform blended paste, while, at the same time, the fact that the blades are oriented in the same direction minimizes agitation and residence time in the blender, thereby avoiding excessive abrasion with the constituents.

As noted previously, the blended mixture of comminuted food product and the gel-forming material (with or without a gelation system) is fed from the continuous mixing apparatus hereof to an extruder, for example, of the type illustrated in the aforementioned No. '766 patent, from the output of which food products of the desired shape are continuously extruded. In accordance with a further feature of the present invention, pumping means, preferably in the form of a Moyno pump, located in the output of the aforementioned blender are provided so that the output pressure from the mixing apparatus matches the required input pressure for the extruder. In connection with such pumping means, pressure detecting means may be provided to monitor the output pressure of the blended mixture to continually provide that the pressure is sufficient for the extruder. If the pressure falls below a pre-established threshold level, the operating speeds of the various drives for the continuous mixing apparatus may be increased, either manually or automatically, in response to the pressure detector, to increase the output pressure. As a further feature of the instant invention, various detectors which may take the form of level detectors, probes, photocell detectors, weight tripping means, hinged micro switches, etc., are strategically located in order to maintain the level of the various hoppers and blender and also to maintain the desired undulating mass of blended mixture in the forward portion of the blender so as to eliminate undesirable air pockets therein.

As noted previously, the instant invention makes possible the fabrication of extruded food products on a continuous basis and eliminates the necessity of premixing batches of the desired materials and then feeding them individually to an extruder hopper. Furthermore, although the aforementioned batch processing technique is claimed to be time independent, it has been found that when a batch or slurry containing comminuted food particles and a gelling material such as an alginate sits for any length of time, the strength of the gelling material deteriorates. Therefore, with such batch processing, extra quantities of the gelling material are required in order to take into account the expected down time which is experienced with an extruder, such as during lunch breaks, equipment maintenance periods, etc. Of course, such a time compensating technique causes its own consistency problems since a product which is manufactured immediately after a batch of material is mixed will have a higher gel strength than a product which is manufactured at a later point in time from that batch. Since the instant invention eliminates in its entirety the concept of batch processing, the aforementioned problems and variation in gel strength are substantially eliminated.

The instant invention solves a further problem associated with fabricated food products in the sense that it makes possible the production of an extruded food product having a fully gelled interior. That is to say, it has been found most desirable to produce a fabricated food product such as an extruded onion ring, with the interior core thereof fully gelled by the reaction of the aforementioned gelable materials and gelation agents. However, prior to the instant invention, where the only production process being employed was a batch process, it was not possible to mix the gelling material with the gelation agent and the comminuted food product prior to extrusion since, if the batch of slurry sat in the hopper for any length of time, gelation would begin to occur and make it that much more difficult to effect subsequent extrusion. This was found to be further true even when an appropriate sequestering agent was employed in the mixture to retard gelation in the hopper, the problem being that no matter what steps were taken to retard gelation before extrusion, there always seemed to be a sufficient number of free calcium ions such that premature advanced gelation would occur in any event. With the instant invention, where the mixing of the materials is performed on a continuous basis, the gelation agent with a suitable sequestering agent can be mixed with the gelling material and continuously combined in the blender with a comminuted food product and, thereafter, immediately fed to the extruder. Because of the speed of operation of this overall process, even with the presence of free calcium ions, extrusion occurs rapidly enough in the process that the extrusion is substantially uneffected by the gelation process, the significant portion of which occurs after extrusion has already taken place.

Accordingly, it is an object of the instant invention to provide apparatus for continuously preparing a mixture of two or more constituents.

Another object of the instant invention is to provide such an apparatus which selectively employs double auger arrangements in conventional and unconventional ways in such a manner as to produce unexpected and desirable results.

Still another object of the instant invention is to provide such an apparatus which includes pumping means at the output thereof so as to match the output pressure of the mixing apparatus with the input pressure of an extruding apparatus with which the mixing apparatus is employed.

Still another object of the instant invention is to provide such an apparatus which includes level detection means in preselected locations to maintain the level of the various constituents employed in the apparatus and to control the feeding of the constituents as a function of the level of the various constituents as sensed by such detectors.

Yet another object of the instant invention is to provide such an apparatus which may be employed in conjunction with extruding apparatus so as to eliminate the problems of gel strength irregularity encountered in prior art batch processing techniques.

Still another object of the instant invention is to provide such an apparatus which makes possible the production of extruded food products having a fully gelled core.

These and other objects of the instant invention may be had by referring to the following specification and drawings in which:

DETAILED DESCRIPTION

Figures 1, 9:
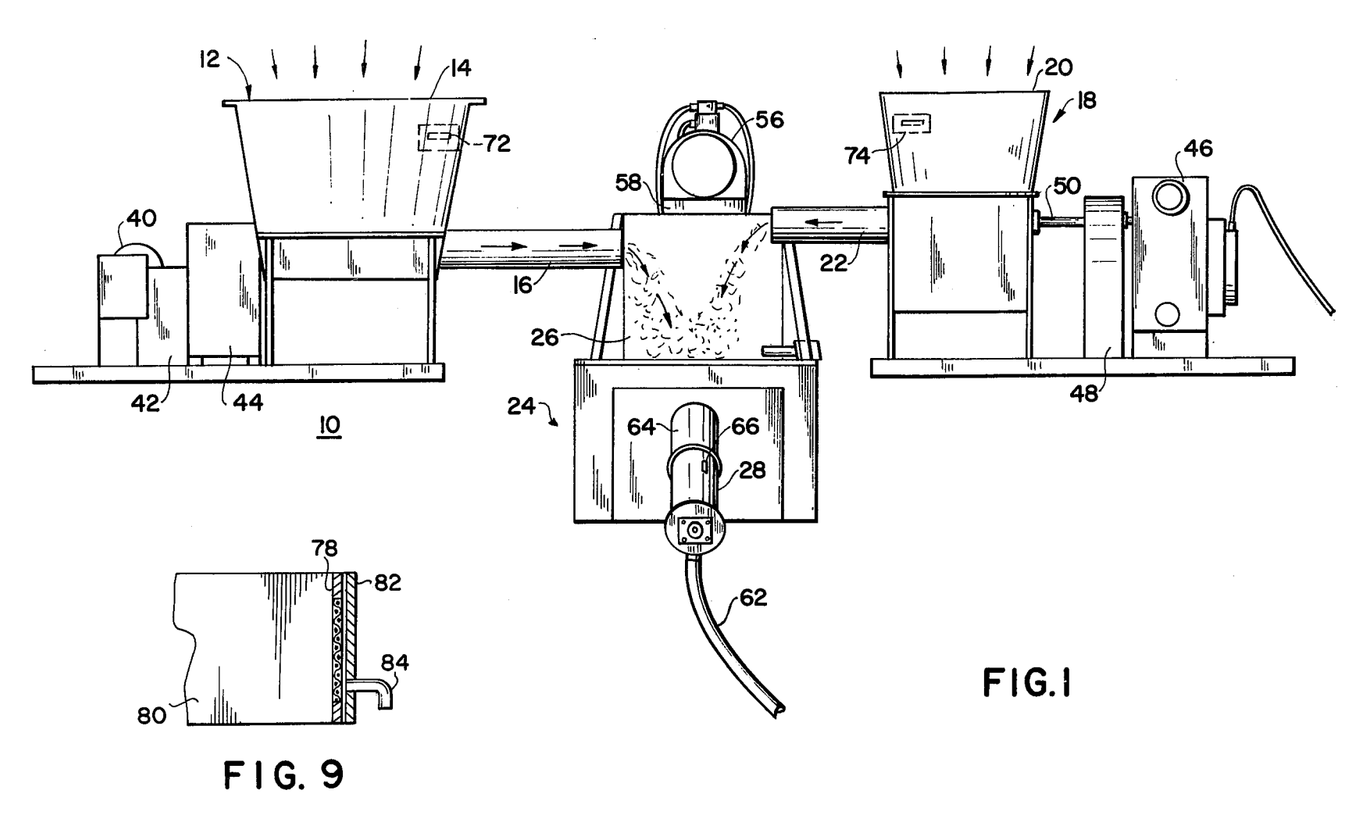
FIG. 1 is a front view of apparatus constructed in accordance with the instant invention.
FIG. 9 is a partial sectional view of the hopper shown in FIG. 8.

Turning to FIG. 1, there is shown apparatus 10 constructed in accordance with the instant invention. The apparatus 10 broadly includes a first container or hopper 12 having an input 14 and an output tube 16. The apparatus further includes a second container or hopper 18, likewise having an input 20 and an output tube 22. Located centrally of the apparatus is a third container or blender 24 having an open input 26 and an output 28.

Figure 6:
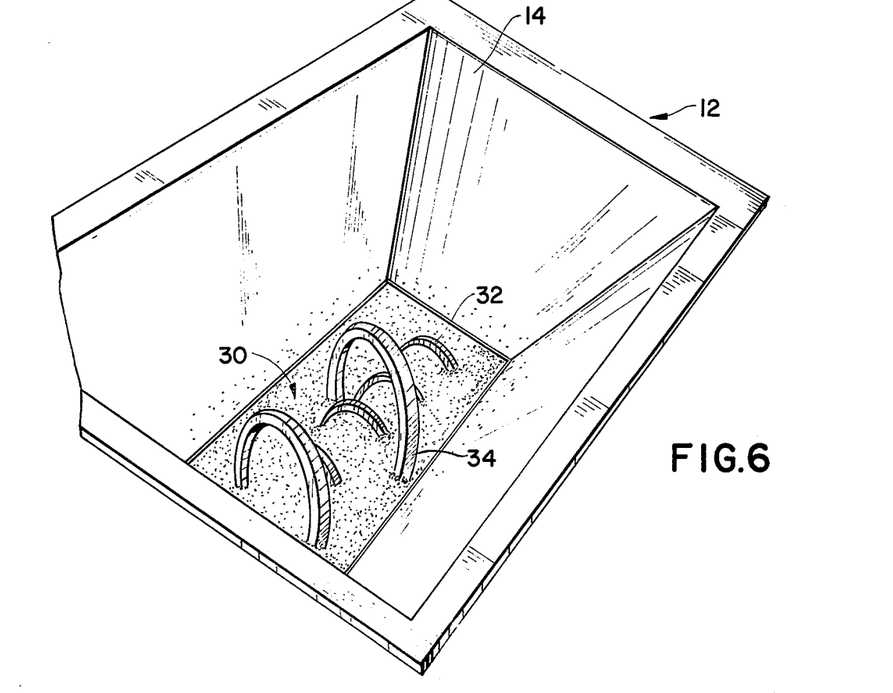
FIG. 6 shows a top view of one of the hoppers employed in the apparatus of FIG. 1 with comminuted food product therein.
Figure 7:
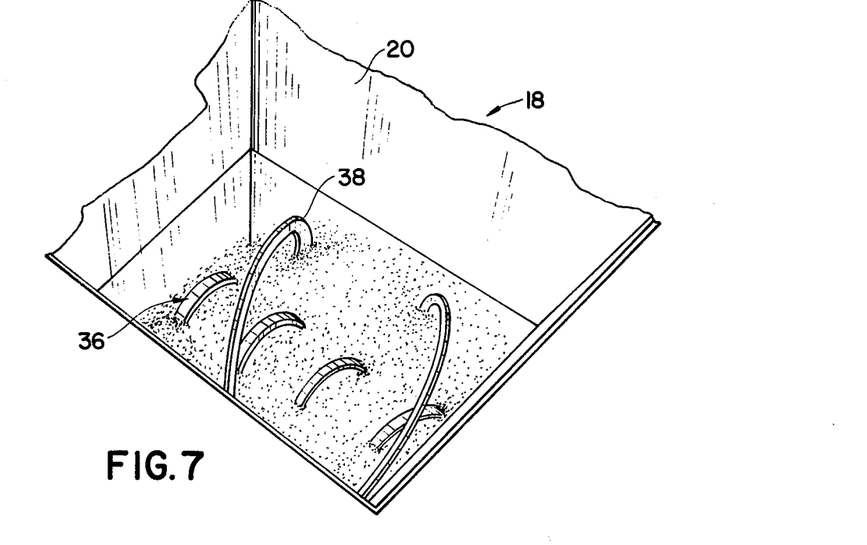
FIG. 7 is a top view of another of the hoppers employed in the apparatus of FIG. 1, illustrating the inclusion of food constituents therein.

As best seen in FIG. 6, the first hopper 12 includes material advancing means 30 comprising first and second hellical augers 32 and 34, the hellical blades or flights of which are generally oriented in opposite directions with respect to one another. Likewise, the second container or hopper 18 includes material advancing means in the form of first and second hellical augers 36, and 38, respectively, the coils or flights of which are likewise hellically oriented in opposite directions. As is well known in the art, it is desirable to orient the hellical oils of the respective augers of the material advancing means of the hoppers 12 and 18 in opposite directions in order to thoroughly agitate the materials being advanced therein and to prevent an excessive buildup of material at the output ends of the respective hoppers.

Returning to FIG. 1, associated with the first container 12 is a variable speed DC motor 40, the output of which is coupled to the input of a gear reduction box 42, the output of which is coupled to the input of a split gear box 44 connected in a conventional manner to the twin augers 32 and 34 of the advancing means 30 by which the relative speeds of the augers 32 and 34 may be varied with respect to one another.

Likewise, associated with the hopper 18 is a variable speed AC motor 46 whose output is connected to a gear reduction box 48, the output 50 of which drives the twin augers 36 and 38. If desired, a split gear box (not shown) may also be employed between the gear reducing box 48 and the hopper 18 if it is desired to permit adjustment in the relative speeds of the augers 36 and 38 with respect to one another.

Figure 2:
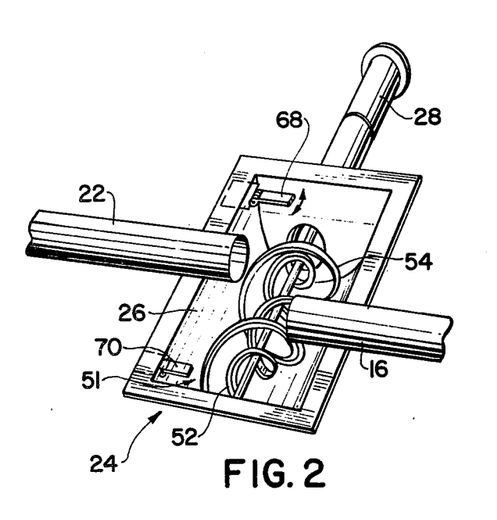
FIG. 2 is a rear top view of a portion of the apparatus shown in FIG. 1.
Figure 3:
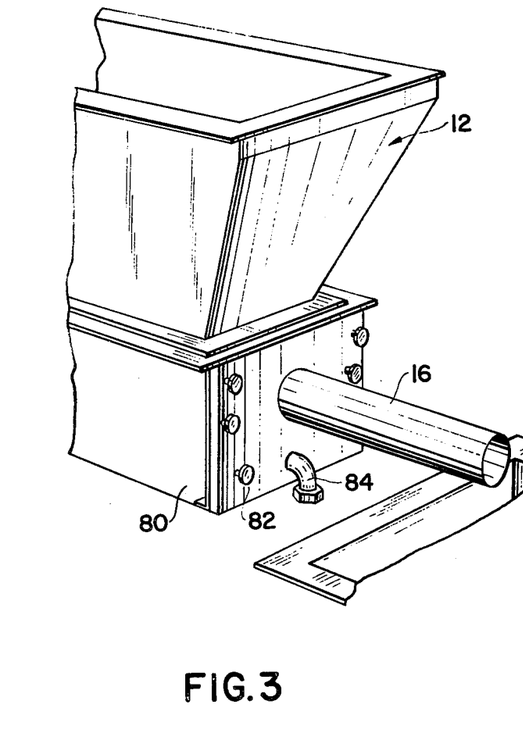
FIG. 3 is a front perspective view of another portion of the apparatus shown in FIG. 1.
Figure 5:
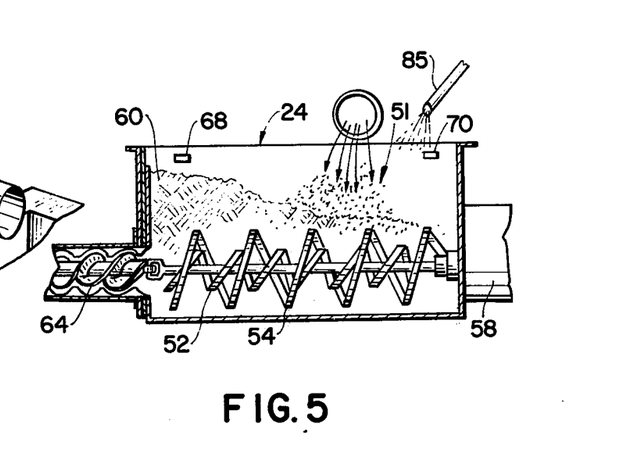
FIG. 5 ia an internal side view of a portion of the apparatus of FIG. 1.

As best seen in FIGS. 2 and 5, the third container or blender 24 includes mixture means 51 in the form of first and second augers 52 and 54, respectively, the coils or flights of which are oriented, contrary to the teachings of the prior art in the same direction for purposes to be further described. Returning to FIG. 1, associated with the blender 24 is a variable speed AC motor 56 and a conventional split gear box 58 by which the rotational speeds of the augers 52 and 54 may be varied with respect to one another.

As explained previously, the present invention may be employed in connection with the manufacture of fabricated food products such as, for example, extruded onion rings. In practicing such a process, hopper 12 is supplied with comminuted food product such as diced onions, and continually advanced by advancing means 30 through the output 16 into the blender 24. Hopper 18 receives a dry matrix powder which, as disclosed in certain of the embodiments of the aforementioned Rivoche patent, may include a gelable material (i.e., a colloid such as an alginate) and, if desired, a gelling agent having a source of calcium ions which may react with gelable material. An appropriate sequestering system may also be employed to retard the gelation reaction until the extrusion of the fabricated food product has been completed. The matrix powder is advanced by augers 36 and 38 and exits the hopper 8 through output 22 into the blender 24. It should be noted that for illustrative purposes only, the augers of the respective hoppers have been shown partially exposed, while, in actual practice, the augers are completely covered.

As best seen in FIG. 2, the output 16 from the hopper 12 is further to the rear of blender 24 than is the output 22 of the hopper 18. Such an arrangement is especially preferred since the comminuted foo product, such as diced onions, is of a moist consistency and tends to cover the augers 52 and 54 prior to the time that the dry matrix powder enters the blender 24 from the output 22. Such an arrangement prevents the otherwise dry matrix powder from caking on the augers 52 and 54.

FIG. 5 shows the blending of the comminuted food product and matrix powder in the hopper 24. In accordance with a feature of the instant invention, and because the augers 52 and 54 are hellically oriented in the same direction, contrary to the manner in which such systems are normally employed, the blended paste of food product and powder is forced to accumulate as a "blob" 60 in the forward outlet end of the blender 24, with the constant pressure of such buildup forcing out undesirable air pockets which would otherwise create undesirable voids in the blended mixture.

The blended paste of food product and matrix powder leaves the blender 24 through output 28 and via a conduit 62 is fed continuously to a conventional extruder, for example, of the type disclosed in the aforementioned No. '766 patent from which fabricated food products of the desired cross-section may be extruded.

Figure 4:
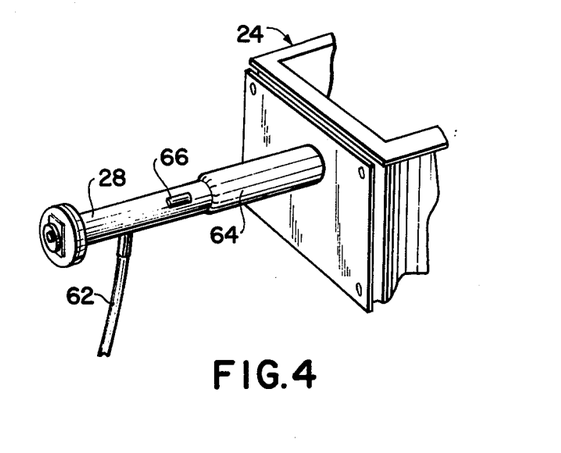
FIG. 4 is a front perspective view illustrating the output of the apparatus of FIG. 1.

In accordance with a further feature of the instant invention, the output 28 of the apparatus 10 may have pumping means associated therewith in order to maintain the pressure of the blended paste at the pressure which is desired for the proper operation of the extruder (not shown). To that end, the output 28 of the blender 24 includes a positive displacement pump 64, such as a conventional Moyno pump, to maintain the output pressure of the blended paste. If desired, a conventional pressure sensing detector 66, for example, of the diaphragm type, may be located in the output 28 of the blender 24 to monitor the pressure of the paste. Should the pressure vary from the predetermined pressure desired for the extruder, the driving motors 40, 46 and 56 may be varied accordingly, either by an operator or automatically as a feedback function of the pressure sensed by the detector 66.

In like fashion, the blender 24 includes level detectors 68 and 70 slidably adjustable across the mixer input opening which sense the level of the mixture within hopper 24. Should the "blob" of blended paste fall below or exceed the level of detector 68, the speeds of driving motors 40 and 46 may be varied accordingly. Level detector 70 is also employed to sense the level of the blended mixture in hopper 24 and may be employed in an alarm function and/or to varythe driving motors 40 and 46 to reduce and/or shut down the further supply of food products and matrix mix in the event, for example, that the extruder has been shut down and the paste ceases to be drawn from the blender through its output 28. Level detectors 72 and 74 are also employed in hoppers 12 and 18, respectively, to indicate overflow and resupply conditions.

Figure 8:
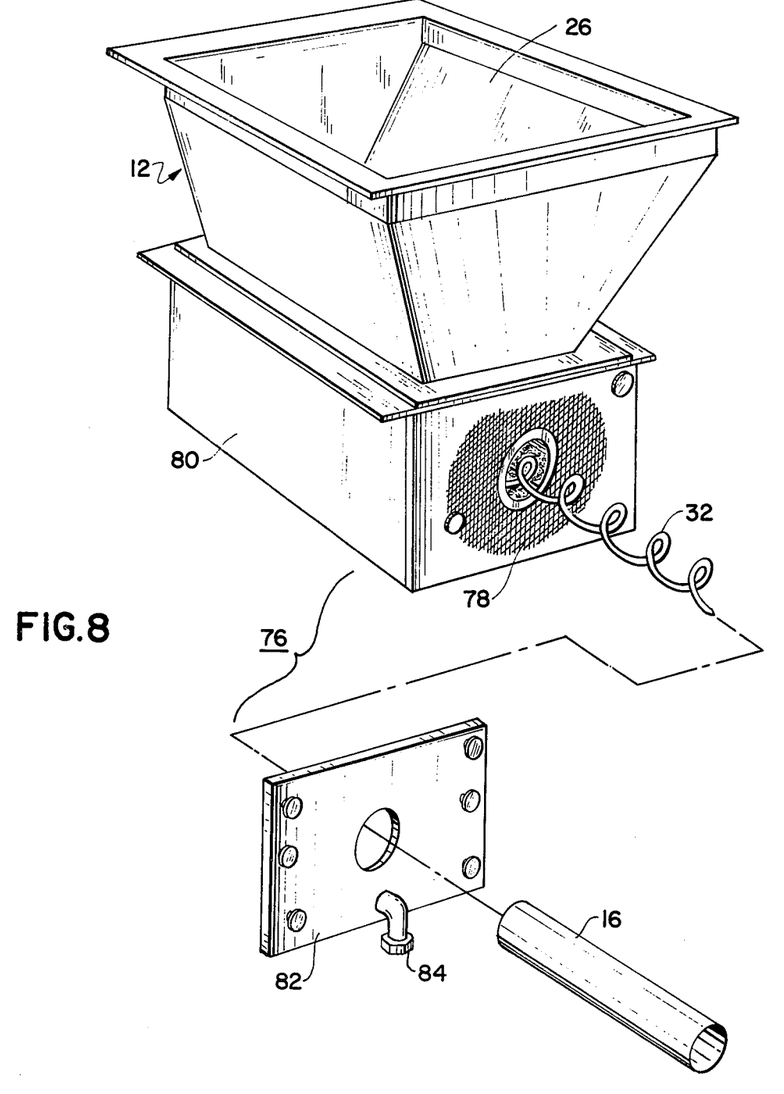
FIG. 8 is a partially exploded perspective view illustrating a feature of the instant invention which makes possible the feeding of comminuted food products of relatively constant moisture content independent of the moisture content of the original food product.

One of the problems encountered in the production of fabricated food products results from the variable moisture content of the food product being employed. For example, in the manufacture of extruded onion rings, variation in the moisture content of the onions creates undesirable variation in the consistency of the paste-like mixture being extruded. For example, with fresh chopped onions, the onion cells weep onion juice. With rehydrated dehydrated diced onions, as excess rehydration liquid results. To solve this problem, and in accordance with a further feature of the instant invention, the hopper 12 is provided with drain means 76 best seen in FIG. 8. Such drain means includes a screen 78, preferably located across the lower portion 80 of the hopper 12 and spaced slightly behind the front plate 82 thereof. Front plate 82 includes a drain spout 84. In operation, as the comminuted food product, such as diced onions, is advanced forward toward the output 16, the food product is present against the screen 78 which permits the excess onion juice or water to pass therethrough and out the hopper 12 through the drain spout 84. In this manner, the variation in moisture content of the food product is substantially eliminated as a factor since excess fluid is withdrawn continuously. Alternatively, or in addition thereto, moisture consistency may be selectively varied by adding water through a spray pipe 85.

Thus, there has been described apparatus for continually preparing a mixture of two or more constituents such as a food product and a matrix mix for use in a fabricated food process which eliminates the problems inherent in previously existing techniques involving batch processing where the food product and the matrix mix are premixed in batch form before being fed to the extruder. Also, since the continuous process of the instant invention is relatively high speed in operation, a complete gelling system may be employed in the matrix mix (with an appropriate sequestering agent if desired), such that after extrusion a fully gelled interior for the food product is possible.

Although this invention has been described with respect to its preferred embodiments, it should be understood that many variations and modifications will now be obvious to those skilled in the art, and it is preferred, therefore, that the scope of the invention be limited, not by the specific disclosure herein, but only by the appended claims.

What is claimed is:

1. Apparatus for continuously preparing a mixture of two or more constituents; said apparatus comprising:
   a first container having
      an input for the reception of a first one of said constituents,
      an output, and
      advancing means for advancing said first one of said constituents through said output;
   a second container having
      an input for the reception of a second one of said constituents,
      an output, and
      advancing means for advancing said second one of said constituents through the output of said second container;
   a third container having
      an input opening for receiving said first and second ones of said constituents from the respective outputs of said first and second containers,
      an output, and
      mixing means for blending said first and second ones of said constituents into a substantially air-free blended mixture and for advancing said blended mixture through the output and said third container;
   further including first driving means for driving said advancing means of said first container; second driving means for driving said advancing means of said second container; and third driving means for driving said mixing means of said third container;
   wherein said first, second and third driving means are each variable speed devices;
   wherein said mixing means in said third container comprises first and second augers hellically oriented in the same direction.

2. The apparatus of claim 1, and further including first level detection means positioned in said first container for detecting the level of said first one of said constituents in said first container, and second level detection means positioned in said second container for detecting the level of said second one of said constituents in said second container.

3. The apparatus of claim 1, wherein said advancing means in said first container comprises first and second augers hellically oriented in opposite directions; said advancing means in said second container comprises first and second augers hellically oriented in opposite directions.

4. The apparatus of claim 1, and further including third level detection means positioned at a predetermined height above the output of said third container for sensing the level of said blended mixture adjacent said output, whereby the speeds of said variable speed devices may be varied as a function of the level of said mixture as detected by said third level detector.

5. The apparatus of claim 4, and further including minimum and maximum level detection means positioned in said third container.

6. The apparatus of claim 1, wherein said one of said constituents is a moisture contacting comminuted food product, and said first container includes drain means for permitting the moisture in said food product to drain from said first container independent of said output thereof.

7. The apparatus of claim 6, wherein said drain means includes a screen through which said moisture, but not said food product, may pass.

8. Apparatus for continuously preparing a mixture of two or more constituents; said apparatus comprising:
   a first container having
      an input for the reception of a first one of said constituents,
      an output, and
      advancing means for advancing said first one of said constituents through said output;
   a second container having
      an input for the reception of a second one of said constituents,
      an output, and
      advancing means for advancing said second one of said constituents through the output of said second container;
   a third container having
      an input opening for receiving said first and second ones of said constituents from the respective outputs of said first and second containers,
      an output, and
      mixing means for blending said first and second ones of said constituents into a substantially air-free blended mixture and for advancing said blended mixture through the output and said third container;
   wherein said mixing means in said third container comprises first and second augers hellically oriented in the same direction;
   wherein said advancing means in said first container comprises first and second augers hellically oriented in opposite directions and said advancing means in said second container comprises first and second augers hellically oriented in opposite directions.

9. The apparatus of claim 8, and further including means for selectively adding moisture to said third container.

10. Apparatus for continuously preparing a mixture of two or more constituents; said apparatus comprising:
    a first container having
       an input for the reception of a first one of said constituents,
       an output, and
       advancing means for advancing said first one of said constituents through said output;
    a second container having
       an input for the reception of a second one of said constituents,
       an output, and
       advancing means for advancing said second one of said constituents through the output of said second container;
    a third container having
       an input opening for receiving said first and second ones of said constituents from the respective outputs of said first and second containers, an output, and
mixing means for blending said first and second ones of said constituents into a substantially air-free blended mixture and for advancing said blended mixture through the output and said third container;
further including first driving means for driving said addvancing means of said first container; second driving means for driving said advancing means of said second container; and third driving means for driving said mixture means of said third container;
wherein said first, second and third driving means are each variable speed devices;
and further including pumping means located at the output of said third container for varying the pressure of said mixture flowing from said output of said third container.

11. The apparatus of claim 10, and further including pressure sensing means for sensing the pressure of said mixture flowing from said pumping means whereby the speeds of said variable speed devices may be varied as a function of the pressure of said mixture as detected by said pressure sensing means.

12. Apparatus for continuously preparing a mixture of two or more constituents; said apparatus comprising:
a first container having
an input for the reception of a first one of said constituents,
an output, and
advancing means for advancing said first one of said constituents through said output;
a second container having
an input for the reception of a second one of said constituents,
an output, and
advancing means for advancing said second one of said constituents through the output of said second container;
a third container having
an input opening for receiving said first and second ones of said constituents from the respective outputs of said first and second containers,
an output, and
mixing means for blending said first and second ones of said constituents into a substantially air-free blended mixture and for advancing said blended mixture through the output and said third container;
and further including pumping means located at the output of said third container for varying the pressure of said mixture flowing from said output of said third container.

13. Apparatus for continuously preparing a mixture of two or more constituents; said apparatus comprising:
a first container having
an input for the reception of a first one of said constituents,
an output, and
advancing means for advancing said first one of said constituents through said output;
a second container having
an input for the reception of a second one of said constituents,
an output, and
advancing means for advancing said second one of said constituents through the output of said second container;
a third container having
an input opening for receiving said first and second ones of said constituents from the respective outputs of said first and second containers,
an output, and
mixing means for blending said first and second ones of said constituents into a substantially air-free blended mixture and for advancing said blended mixture through the output and said third container;
wherein said mixing means in said third container comprises first and second augers hellically oriented in the same direction;
wherein said advancing means in said first container comprises first and second augers hellically oriented in opposite directions and said advancing means in said second container comprises first and second augers hellically oriented in opposite directions;
wherein said one of said constituents is a moisture containing comminuted food product, and said first container includes drain means for permitting the moisture in said food product to drain from said first container independent of said output thereof.

14. Apparatus for continuously preparing a mixture of two or more constituents; said apparatus comprising:
a first container having
an input for the reception of a first one of said constituents,
an output, and
advancing means for advancing said first one of said constituents through said output;
a second container having
an input for the reception of a second one of said constituents,
an output, and
advancing means for advancing said second one of said constituents through the output of said second container;
a third container having
an input opening for receiving said first and second ones of said constituents from the respective outputs of said first and second containers,
an output, and
mixing means for blending said first and second ones of said constituents into a substantially air-free blended mixture and for advancing said blended mixture through the output and said third container,
further including first driving means for driving said advancing means of said first container; second driving means for driving said advancing means of said second container; and third driving means for driving said mixing means of said third container;
wherein said first, second and third driving means are each variable speed devices;
and wherein said third container includes a front wall through which its output passes and further including level detection means positioned in close proximity to said front wall and at a predetermined height above the output of said third container for sensing the level of said blended mixture adjacent said output, whereby the speeds of said variable speed devices may be varied as a function of the level of said mixture as detected by said level detection means.

15. The apparatus of claim 14, wherein said mixing means comprises first and second augers hellically oriented in the same direction.

* * * * *

UNITED STATES PATENT AND TRADEMARK OFFICE
CERTIFICATE OF CORRECTION

PATENT NO. : 4,201,484

DATED : May 6, 1980

INVENTOR(S) : Ronald J. Sasiela and Daniel T. Layne

It is certified that error appears in the above-identified patent and that said Letters Patent are hereby corrected as shown below:

Column 1, Line 63, "perparing" should read --preparing--.

Line 66, "dices" should read --diced--.

Column 2, Line 9, "an" should read --and--.

Column 5, Line 37, "8" should read --18--.

Line 45, "foo" should read --food--.

Column 8, Line 5, "contacting" should read --containing--.

Line 5, "consituents" should read --constituents--.

Signed and Sealed this

Twenty-sixth Day of August 1980

[SEAL]

Attest:

SIDNEY A. DIAMOND

Attesting Officer

Commissioner of Patents and Trademarks